(12) United States Patent
Dietz

(10) Patent No.: US 6,307,952 B1
(45) Date of Patent: Oct. 23, 2001

(54) APPARATUS FOR DETECTING GUEST INTERACTIONS AND METHOD THEREFORE

(75) Inventor: Paul H. Dietz, Hopkinton, MA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 09/261,654

(22) Filed: Mar. 3, 1999

(51) Int. Cl.[7] .................................................. G06K 9/00
(52) U.S. Cl. ............................................................ 382/107
(58) Field of Search .................................... 382/100, 107, 382/312; 348/1, 2, 13, 21, 77, 162, 163; 345/112, 326, 358; 463/1, 7, 9, 36, 37, 49, 53

(56) References Cited

U.S. PATENT DOCUMENTS

| | | | |
|---|---|---|---|
| Re. 30,288 | 5/1980 | Hacket | 342/28 |
| 2,655,645 | 10/1953 | Bagno | 367/93 |
| 2,782,405 | 2/1957 | Weisz et al. | 340/507 |
| 3,108,271 | 10/1963 | Bagno | 342/28 |
| 3,582,870 * | 6/1971 | Peterson et al. | 367/94 |
| 3,725,854 | 4/1973 | Otsuka | 367/94 |
| 3,760,400 | 9/1973 | Galvin et al. | 340/554 |
| 3,781,773 | 12/1973 | Ravas | 367/94 |
| 3,796,989 | 3/1974 | Ravas et al. | 367/41 |
| 3,845,461 | 10/1974 | Foreman | 367/94 |
| 4,225,858 | 9/1980 | Cole et al. | 340/554 |
| 4,319,349 | 3/1982 | Hackett | 367/94 |
| 4,541,080 | 9/1985 | Kodaira | 367/94 |
| 4,917,373 * | 4/1990 | Bourne et al. | 472/61 |
| 4,961,039 | 10/1990 | Yamauchi et al. | 340/554 |
| 5,281,961 | 1/1994 | Elwell | 340/825 |
| 5,566,934 * | 10/1996 | Black et al. | 473/43 |
| 5,846,086 * | 12/1998 | Bizzi et al. | 434/247 |
| 5,980,256 * | 11/1999 | Carmen | 434/55 |
| 5,982,352 * | 11/1999 | Pryor | 345/156 |
| 6,061,064 * | 5/2000 | Reichlen | 345/418 |
| 6,066,075 * | 5/2000 | Poulton | 482/8 |

* cited by examiner

Primary Examiner—Andrew W. Johns
Assistant Examiner—Shervin Nakhjavan
(74) Attorney, Agent, or Firm—Christie, Parker & Hale, LLP

(57) ABSTRACT

An apparatus detects individual guest interactions in an installation (10) for entertaining one or more guests (12). The apparatus comprises one or more directional, velocity-dependent sensors (24), each motion sensor having a field of view covering a different one of the guests. The motion sensor generates a guest-interaction signal (26) when the guest in its field of view moves in an appropriate manner. The motion sensor can be arranged directly above or in front of the guest, depending on the type of motion that is desired to be detected. The sensor can employ an ultrasonic signal to detect motion, which is less susceptible to light and radio-frequency interference. A controller (22) responds to the guest-interaction signals and manipulates a plurality of guest interfaces (18,20,21).

16 Claims, 3 Drawing Sheets

FIG. 3

28 → ULTRASONIC TRANSDUCER 32 ← 40.0 kHz OSCILLATOR 35

30 → ULTRASONIC TRANSDUCER 34

24

36: ADC 50 → POWER SPECTRUM → SUM INBAND POWER → TRIGGER IF OVERLIMIT → OUTPUT

APPARATUS FOR DETECTING GUEST INTERACTIONS AND METHOD THEREFORE

FIELD OF THE INVENTION

The present invention relates generally to the field of entertainment installations, and, more particularly, to an apparatus for detecting guest interactions, and method therefore, in an entertainment installation. Although the present invention is subject to a wide range of applications, it is especially suited for use in an interactive entertainment installation, and will be particularly described in that connection.

BACKGROUND OF THE INVENTION

Apparatus for detecting guest interactions in an entertainment installation provide individual guests, either alone or in a group, the ability to interact with the entertainment installation. In response to the detection of the guest interaction, the entertainment installation can react to the individual guest that indicated a need for specific attention.

Conventional apparatus for detecting guest interactions are known. For example, television game shows typically have button-operated devices installed near the contestant or each audience seat. The contestant or audience member can depress one or more buttons to register their answer or preference. This allows the game show host to single out the individual who may have been first to solve a question posed by the game show host or to quickly collate the responses of an audience and obtain a majority view on a question having multiple choice answers. Although suitable for some game shows, such button-operated devices are not a natural way to get attention and require some instruction for their use. This can be a problem especially with younger guests, such as, children. A simpler and more natural way to interact or get attention is hand raising, which is usually learned at a young age when a child enters kindergarten or preschool.

A need therefore exists for an apparatus for detecting guest interactions, and method therefore, in an entertainment installation that detects guest interactions in the form of body motions of individual guests and can distinguish the individuals in the group who initiate the guest interaction.

SUMMARY OF THE INVENTION

The present invention, which tends to address this need, resides in an apparatus for detecting guest interactions, and method therefore. The entertainment installation described herein provides advantages over known apparatus for detecting guest interactions in that it detects guest interactions in the form of body motions and can distinguish the individuals in the group who initiate the guest interaction.

According to the present invention, the interaction of each guest is detected. This can be accomplished by providing motion sensors to monitor each guest and generating a guest-interaction signal. The motion sensors can be directional and velocity dependent. Thus, whenever a guest makes an appropriate gesture, the guest interaction of each guest is detected.

In accordance with one aspect of the present invention, detecting the guest interaction by a vertical movement of the guest, such as, a hand-raising gesture or a hand-lowering gesture. This can be accomplished by arranging the directional, velocity-dependent motion sensor directly above the guest. Thus, a horizontal movement, such as, walking or swaying, would not cause detection of a guest interaction.

In accordance with another aspect of the present invention, detecting the guest interaction by a horizontal movement of the guest, such as, a forward-thrown punch or kick. This can be accomplished by arranging the motion sensors directly in front of the guests. Thus, other gross gestures, beyond hand raising, can be detected. In general, guest motions that have unique velocities in some direction can be detected.

In accordance with still another aspect of the present invention, generating the guest-interaction signal in response to a received reflected ultrasonic signal. This can be accomplished by using transmitters and receivers to transmit and receive an ultrasonic signal, and a detection circuit for generating the guest-interaction signal in response to the received reflected ultrasonic signal. Thus, the use of ultrasound signal instead of a radio-frequency or light signal makes the apparatus insensitive to environmental radio-frequency emissions and light. Analogous systems could be implemented using electromagnetic signals or light. These extensions are apparent to those skilled in the art.

In a detailed aspect of the present invention, the guest-interaction signal is generated when the power of the received reflected signal in a predetermined frequency band exceeds a threshold. This can be accomplished by the detection circuit. Thus, through selection of the predetermined frequency and the threshold, certain unwanted movements can be "filtered out" so as to not generate a false guest-interaction signal.

In further accordance with the present invention, a plurality of guest interfaces can be manipulated in response to each generated guest-interaction signal. This can be accomplished by a controller that receives the guest-interaction signals and is programmed to take the appropriate action. Thus, an environment is created that allows the guests to interact with the entertainment installation through the guests' movements.

In accordance with the method of this invention, for each of the plurality of guests, emitting a signal of a predetermined frequency in the direction of the guest, receiving the signal reflected from the guest, and generating, in response to the received reflected signal, a guest-interaction signal.

Other features and advantages of the present invention will be set forth in part in the description which follows and accompanying drawings, wherein the preferred embodiments of the present invention are described and shown, and in part become apparent to those skilled in the art upon examination of the following detailed description taken in conjunction with the accompanying drawings, or may be learned by practice of the present invention. The advantages of the present invention may be realized and attained by means of the instrumentalities and combinations particularly pointed out in the appended claims.

BRIEF DESCRIPTION OF THE DRAWINGS

FIG. 3 is a functional block diagram of another embodiment of a motion sensor.

DESCRIPTION OF THE PREFERRED EMBODIMENTS

Figure 1:
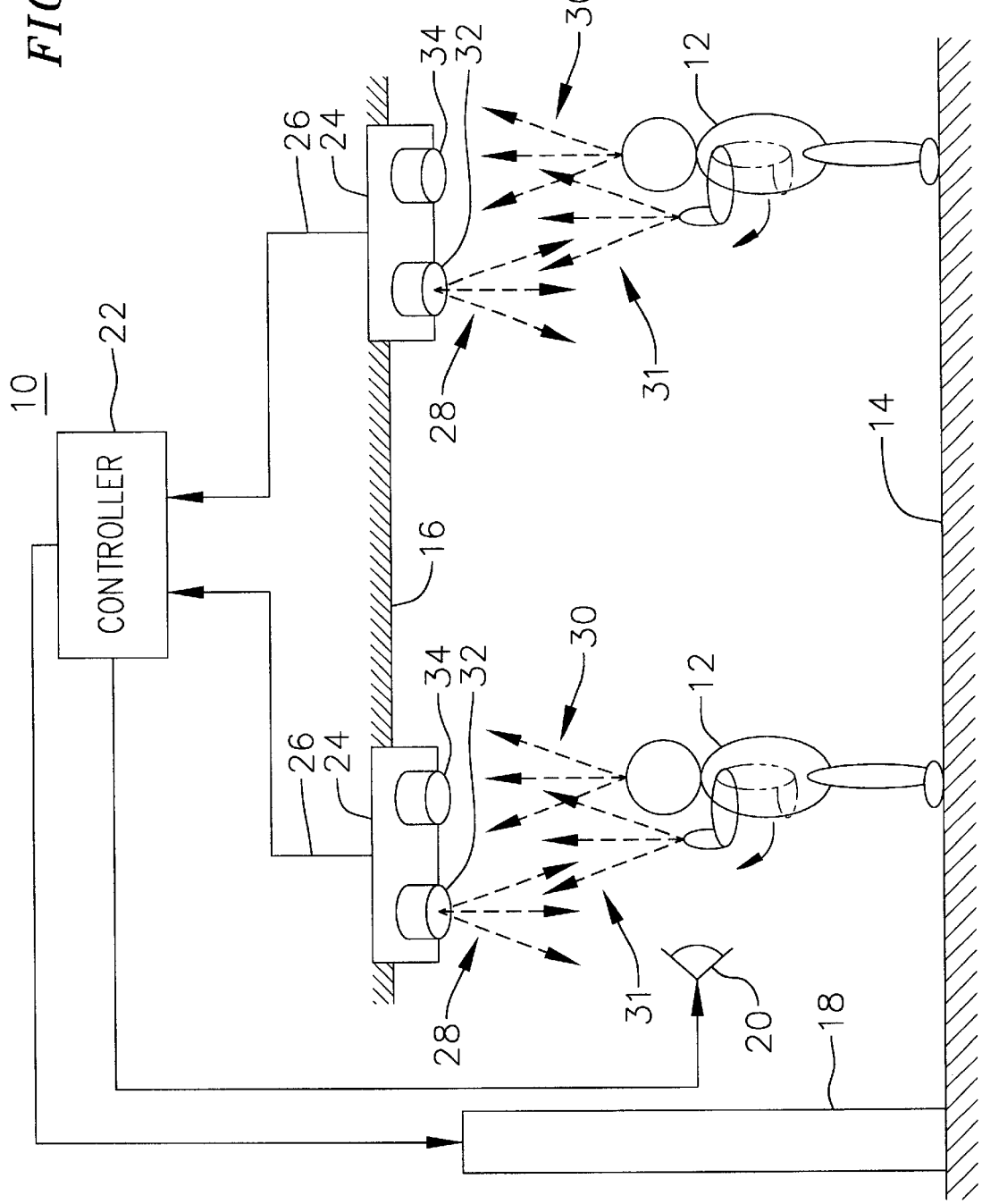
FIG. 1 is an exemplary view of an interactive entertainment installation configured according to the present invention.

With particular reference to FIG.1, an interactive entertainment installation 10 can entertain a number of guests 12.

In this embodiment, the interactive entertainment installation is bounded by a floor 14 and a ceiling 16. The interactive entertainment installation includes a plurality of guest interfaces, such as, a display 18 and a speaker 20, which, in this embodiment, are commonly viewed and heard by the guests. Furthermore, a controller 22 can manipulate the plurality of guest interfaces by, for example, changing images displayed on the screen and the audio content delivered by the speaker.

In the illustrated embodiment, which is configured according to the present invention, an apparatus for detecting individual guest interactions comprises at least two motion sensors 24 each having a field of view covering a different one of the at least two guests 12. Neither motion sensor's field of view encompasses more than one guest. The motion sensor can generate a guest-interaction signal 26 when the guest moves appropriately, which is then fed to the controller 22. Accordingly, the individual guest interactions, in the form of body motions, are detected, and the individuals in the group who initiate the guest interaction can be distinguished by the controller. Based on the individual guest-interaction signals, the controller manipulates the guest interfaces in response to each generated guest-interaction signal according to programmed instructions.

The interactive entertainment installation 10 can be divided into a plurality of defined areas that a guest 12 can occupy. The motion sensor 24 can be arranged directly above the guest 12, preferably, installed in the ceiling 16, and configured to emit a signal 28 in the direction of a different one of the plurality of defined areas. Furthermore, the motion sensor receives a signal 30 reflected from the defined area and generates the guest-interaction signal in response to the received reflected signal when the guest occupying the defined area physically moves.

In the overhead configuration, a suitable vertical movement by the guest 12 occupying the defined area would cause generation of the guest-interaction signal 26. Suitable vertical movements can be a hand-raising gesture, a hand-lowering gesture, rising from a chair, or sitting down in the chair. As the body moves, for example, the hand moves towards the motion sensor, the shortening path of signal 28 will cause the reflected signal 31 to shift higher in frequency proportional to the velocity of motion. This is commonly referred to as a Doppler shift. As the hand is lowered, the reflected signal will shift lower in frequency. Stationary parts of the guest, such as, the head, do not cause a Doppler shift and neither do horizontal movements in the overhead configuration. Thus, the reflected signal 30 from the head of the guest has the same frequency as signal 28.

To prevent cross talk between the motion sensors, different frequencies can be used for neighboring units.

If the motion sensor is arranged directly in front of the guest 12 occupying the defined area, then a horizontal movement by the guest can cause generation of the guest-interaction signal 26. Suitable horizontal movements can be a forward-thrown punch, kick, or similar motion.

Figure 2:
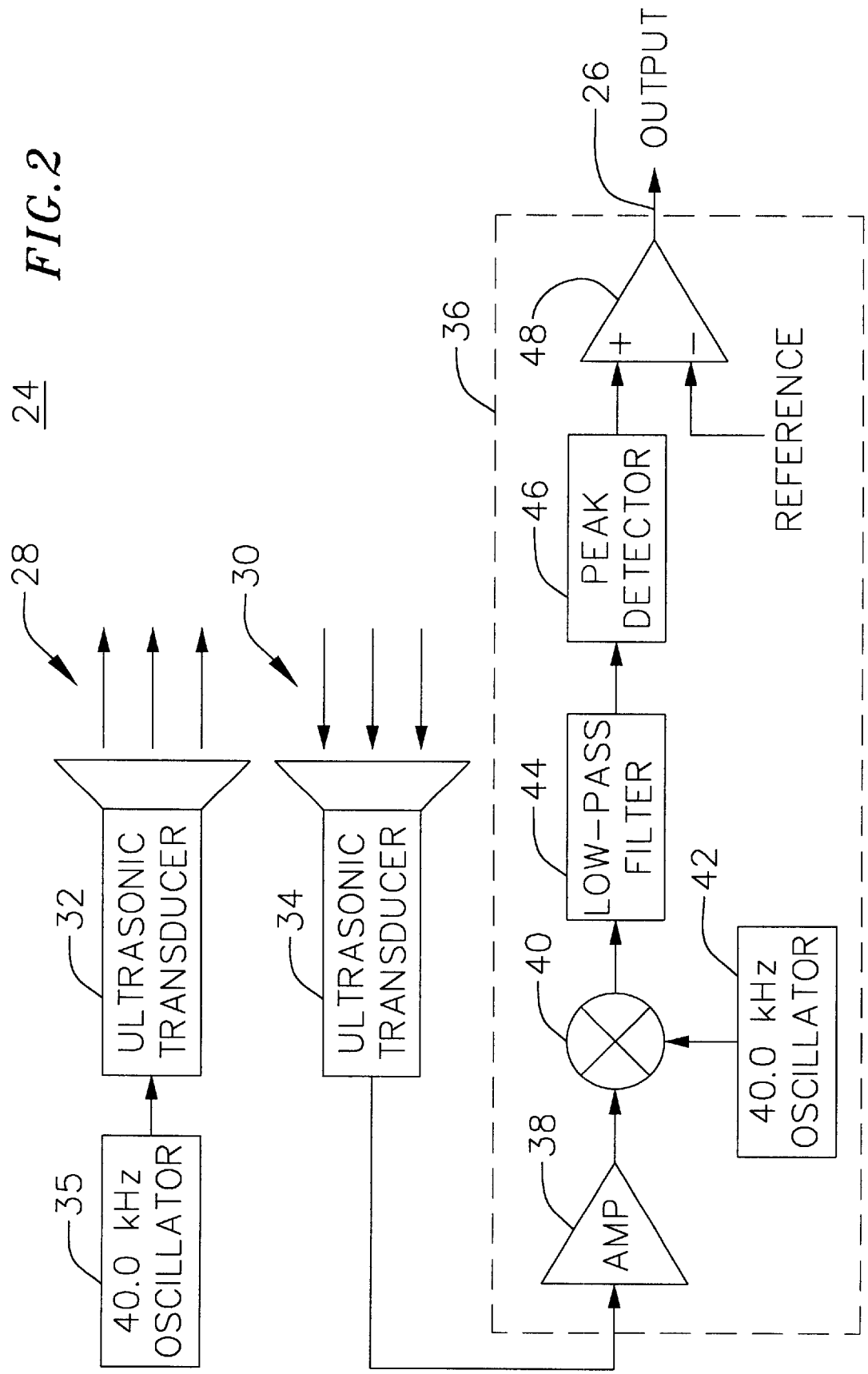
FIG. 2 is a functional block diagram of one embodiment of a motion sensor.

FIG. 2 is a functional block diagram of one embodiment of the motion sensor 24 suitable for use in detecting motion of the guest 12. In this illustrated embodiment, a transmitter 32 emits the signal 28 in the direction of the guest. A receiver 34 receives the signal 30 reflected from the guest. Preferably, the signal is an ultrasound signal, which makes the sensor insensitive to environmental radio-frequency or light interference, although analogous systems using radio frequency or light are possible. Furthermore, an ultrasound signal is not heard by the guest. In this embodiment, a 40 kilohertz oscillator 35 is used to drive the transmitter, which in turn emits an ultrasonic signal having a tone, or frequency, of 40 kilohertz.

The transmitter 32 and the receiver 34 can be any pair of suitable ultrasonic transducers, for example, transducers having model numbers MA40A3S and MA40A3R available from Murata Electric, N.A., of Rockmart, Ga.

A detection circuit 36 is responsive to the received reflected ultrasound signal 30 for generating the guest-interaction signal 26 when the power of the received reflected signal 30 in a predetermined frequency band exceeds a reference threshold. A skilled artisan will recognize that power can be measured by numerous well-know methods, for example, by analog or digital methods. Furthermore, the frequency band and threshold can be set in various combinations depending on the application and the type and degree of motions to be detected.

FIG. 2 illustrates an analog implementation of the detection circuit 36. Amplifier 38 amplifies the received signal 30, and modulator 40 mixes the amplified signal with a 40.4 kHz signal from an oscillator 42 to heterodyne the frequency regions of interest down near to zero frequency. A high-order low-pass filter 44 strongly attenuates the unwanted higher frequency signals, for example, above 50 Hertz. Both the modulator and the low-pass filter can be implemented using switched-capacitor techniques. A peak detector 46 and a comparator 48 determine when there is significant in-band energy indicating that movement has occurred, for example, a hand has been raised.

The present invention is capable of other and different embodiments, and its several details are capable of modification. For example, another embodiment configured according to the present invention is shown in FIG. 3, which is a functional block diagram of another embodiment of the motion sensor 24. In this digital implementation, most of the tasks are performed in software. Where appropriate the same reference numerals are used to avoid unnecessary duplication and description of similar elements already referred to and described above. Only the significant differences of the second embodiment as compared to the first embodiment will be discussed hereafter.

An analog-to-digital convertor 50 digitizes the received reflected signal 30. Using software techniques, for example, in a commercial package entitled LabView available from National Instruments of Austin, Texas, the power spectrum of the digitized signal is calculated, and then the total power in the band of interest (approximately 40.2 kHz to 40.6 kHz for a hand-raising gesture) is derived. If the total power is significantly over a predetermined threshold, for example, the noise floor, a hand-raising gesture is indicated. By examining frequencies below 40 kilohertz, downward hand motion can be similarly detected.

In conclusion, the apparatus and method described herein provides detection of guest interactions in the form of body motions and can distinguish the individuals in the group who initiate the guest interaction. This is primarily accomplished by multiple sensors, each focused on a different guest.

Those skilled in the art will recognize that other modifications and variations can be made in the apparatus and method of the present invention and in construction and operation of this apparatus and method without departing from the scope or spirit of this invention.

What is claimed is:

1. An apparatus for detecting individual guest interactions in an installation for entertaining one or more guests, the apparatus comprising at least one directional, velocity-dependent sensor, each having a field of view uniquely covering each guest and generating a guest-interaction signal when the guest in the field of view makes an appropriate gesture.

2. The apparatus of claim 1, wherein each directional, velocity-dependent motion sensor is arranged directly above the corresponding guest.

3. The apparatus of claim 1, wherein each directional, velocity-dependent motion sensor is arranged directly in front of the corresponding guest.

4. The apparatus of claim 1, wherein each directional, velocity-dependent motion sensor includes:
 a transmitter for emitting an ultrasonic signal of a predetermined frequency in the direction of the guest;
 a receiver for receiving the ultrasonic signal reflected from the guest; and
 a detection circuit responsive to the received reflected ultrasonic signal for generating the guest-interaction signal.

5. The apparatus of claim 4, wherein each detection circuit generates the guest-interaction signal when the power of the received reflected signal in a predetermined frequency band exceeds a threshold.

6. An interactive entertainment installation, the interactive entertainment installation being divided into a plurality of defined areas, each defined area for occupancy by at least one guest of a plurality of guests of the interactive entertainment installation, the interactive entertainment installation comprising:
 a plurality of guest interfaces;
 one or more directional, velocity-dependent motion sensors, each directional, velocity-dependent motion sensor configured to emit an ultrasonic signal in the direction of a different one of the plurality of defined areas, to receive the ultrasonic signal reflected from the different one of the plurality of defined areas, and to generate a guest-interaction signal in response to the received reflected ultrasonic signal from the different one of the plurality of defined areas when the at least one guest occupying the different one of the plurality of defined areas makes an appropriate gesture; and
 a controller for manipulating the plurality of guest interfaces in response to each generated guest-interaction signal.

7. The interactive entertainment installation of claim 6, wherein each directional, velocity-dependent motion sensor is arranged directly above the different one of the plurality of defined areas, and the physical movement for generating a guest-interaction signal is a vertical movement within a certain velocity range by the at least one guest occupying the different one of the plurality of defined areas.

8. The interactive entertainment installation of claim 7, wherein the vertical movement is a hand-raising gesture.

9. The interactive entertainment installation of claim 7, wherein the vertical movement is a hand-lowering gesture.

10. The interactive environment of claim 7, wherein the vertical movement comprises an upward body movement.

11. The interactive environment of claim 7, wherein the vertical movement comprises a downward body movement.

12. The interactive environment of claim 7, wherein the guest-interaction signal is not generated for stationary parts of the guest.

13. The interactive entertainment installation of claim 6, wherein each directional, velocity-dependent motion sensor is arranged directly in front of the at least one guest occupying the different one of the plurality of defined areas, and the physical movement for generating a guest-interaction signal is a horizontal movement by the at least one guest.

14. The interactive entertainment installation of claim 13, wherein the horizontal movement is a forward-thrown punch, kick, or similar motion.

15. An interactive entertainment installation, the interactive entertainment installation being divided into a plurality of defined areas, each defined area for occupancy by at least one guest of a plurality of guests of the interactive entertainment installation, the interactive entertainment installation comprising:
 means for interfacing with the plurality of guests;
 for each defined area,
  means for emitting a signal of a predetermined frequency in the direction of a different one of the plurality of defined areas and receiving the signal reflected from the different one of the plurality of defined areas, and
  means responsive to the received signal reflected from the different one of the plurality of defined areas for generating a guest-interaction signal; and
 means for manipulating the plurality of guest interfaces in response to each generated guest-interaction signal.

16. A method for detecting guest interactions in an interactive entertainment installation, the interactive entertainment installation for occupancy by a plurality of guests, the method comprising:
 for each of the plurality of guests,
  emitting a signal of a predetermined frequency in the direction of the guest,
  receiving the signal reflected from the guest with a directional, velocity-dependent sensor, wherein each sensor has a field of view uniquely covering each guest, and
  generating, in response to the received reflected signal in the field of view, a guest-interaction signal.

* * * * *